UNITED STATES PATENT OFFICE.

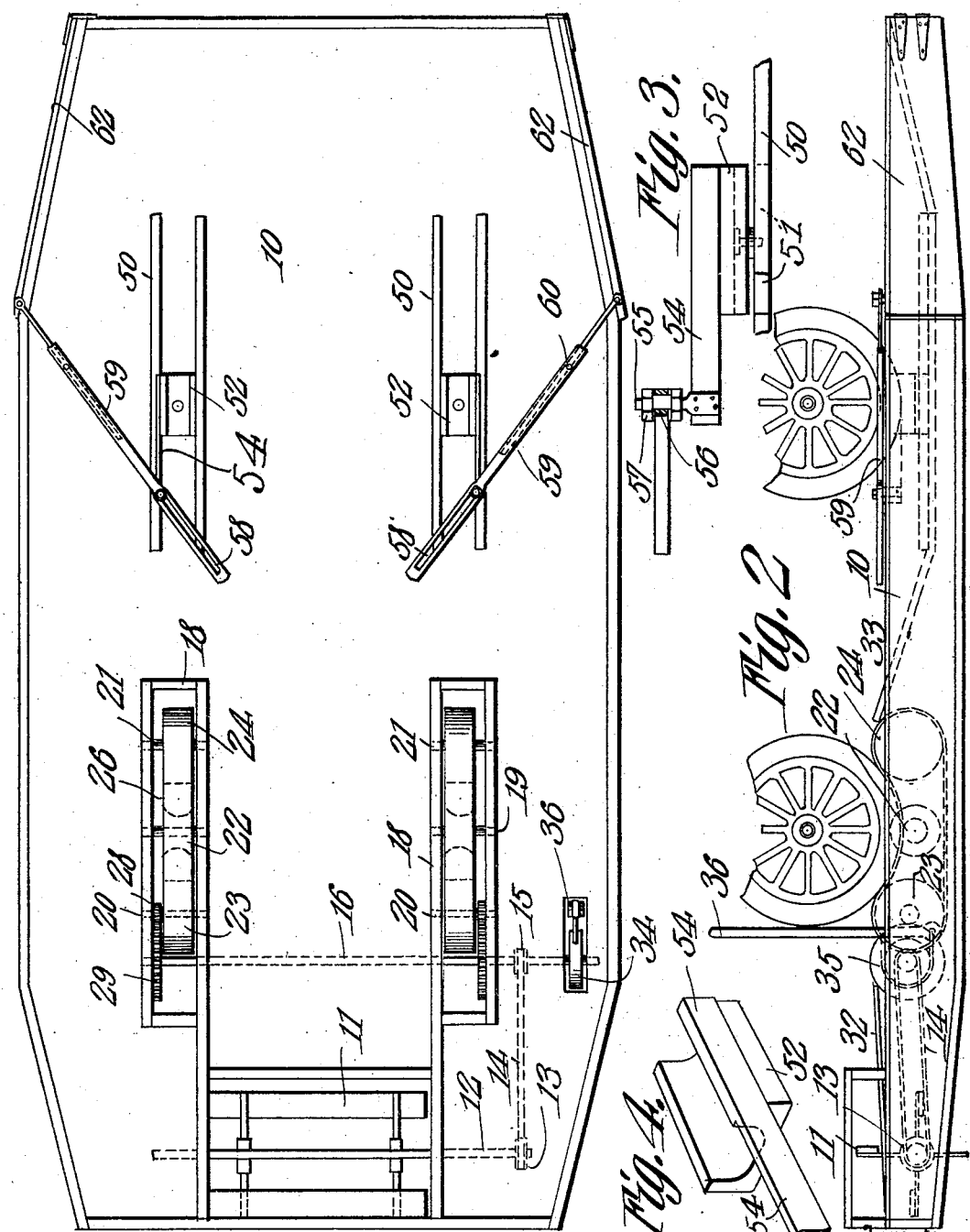

JOHN W. FREEMAN, OF JOPLIN, MISSOURI.

AUTOMOBILE-PROPELLED VESSEL.

No. 928,955.

Specification of Letters Patent.

Patented July 27, 1909.

Application filed October 6, 1908. Serial No. 456,358.

*To all whom it may concern:*

Be it known that I, JOHN W. FREEMAN, a citizen of the United States, residing at Joplin, in the county of Jasper and State of Missouri, have invented a new and useful Automobile-Propelled Vessel, of which the following is a specification.

This invention relates to automobile propelled vessels, and has for its principal object to provide a construction in which an automobile of any type may be run on to a boat and the driving element of the automobile employed for the purpose of propelling said boat.

A further object of the invention is to provide a novel means for connecting the driving wheels of the automobile to the boat propelling device.

A still further object of the invention is to provide an improved means whereby the steering wheel or similar member of the automobile may be manipulated to direct the course of the boat.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a plan view of an auto-drive boat constructed in accordance with the invention. Fig. 2 is a side elevation of the same. Fig. 3 is a side elevation of one of the pivoted steering shoes and its connections. Fig. 4 is a detail perspective view of one of the shoes detached.

Similar numerals of reference are employed to indicate corresponding parts throughout the several figures of the drawings.

In carrying out the present invention there is provided a boat having propelling member or members and on to which the automobile of any type may be driven under its own power. When in position on the boat, the driving power of the automobile is connected to the boat propelling device or devices and at the same time provision is made for connecting the steering rudder or rudders of the boat to the steering wheel or other member of the automobile, so that the chauffeur seated in the automobile may operate his machine in the same manner as on land for the purpose of moving ahead or astern, running at high or low speed and steering in either direction.

The boat 10 may be of any desired type, but in the presence instance is shown in the form of a flat bottom boat, slightly tapered at both bow and stern. The mid-ship section of the stern of the boat is cut away for the reception of a propeller 11 which in the present instance takes the form of a paddle wheel, and this propeller is mounted on a thwartship shaft 12 having at one end a belt or sprocket wheel 13 that is connected by a link belt 14 to a sprocket wheel 15 mounted on a second shaft 16 carried by suitable bearings.

Adjacent each side of the boat and spaced apart a distance corresponding to the distance between the driving wheels of the automobile are casings or frames 18, each of which is provided with bearings for the reception of three parallel shafts 19, 20 and 21. On these shafts are mounted wheels or rollers 22, 23 and 24, respectively, the periphery of the wheel 22 being provided with a groove of approximately semi-circular form in cross section, corresponding to the cross section of the tire, while the peripheries of the remaining wheels or rollers may be plain.

Extending around the several wheels or rollers are friction drive belts 26 and the upper run of each belt is arranged to receive the tire of one of the drive wheels, while the wheels or rollers are so proportioned and arranged that the upper run of the belt may sink down to follow the contour of the driving wheel in the manner shown in Fig. 2, the belt being positively gripped between the periphery of the driving wheel and the peripheries of the several rollers, so that all of the rollers will be revolved. The shaft 20 of roller 23 is provided with a pinion 28 that intermeshes with a gear 29 on the shaft 16, so that so long as the driving wheels of the automobile are rotated, movement will be imparted through the connections described to the paddle wheel and the boat will be moved ahead or astern, as desired.

In order that the automobile may enter and leave the boat properly, inclined planes 32 and 33 are provided, in longitudinal alinement with casings 18, but when the automobile is to move from the boat it becomes necessary to provide some means for holding the belt 26 and the several rollers from movement. For this purpose one of the shafts, in the present instance the shaft 16, is provided with a friction drum 34, that is engaged by a band brake 35 connected to an operating lever 36, and by manipulating this lever the several shafts may be held stationary, so that the automobile may move out over the belts and inclined planes 33.

Near the bow of the boat are arranged two pairs of parallel guides 50 arranged for the reception of slidable blocks 51 which may be moved in the direction of the length of the boat for the purpose of accommodating automobiles having different lengths of wheel base. To these blocks are pivoted steering shoes 52 which may be concaved longitudinally and which are of approximately U-shape in cross section in order to engage against the opposite sides of the tires and felly of the steering wheel, so that when said steering wheels are manipulated by the steering mechanism of the automobile, the steering shoes 52 will be turned on their vertical pivots.

Extending rearward from each of the shoes 52 is an arm 54 provided at its rear end with a vertical stem 55 on which is mounted an anti-friction roller 56 held from vertical play by lock nuts and washers 57 of any ordinary construction. Each anti-friction roller 56 is arranged to move against an elongated slot 58 formed in the rear end of a rod 59. This rod 59 is formed of a pair of telescopically projecting members which may be locked together by a set screw 60 or similar fastening device. The telescopic construction of the rods permits of the adjustment of the steering shoes and their carrying blocks in accordance with the length of the wheel base of the automobile. At each side of the bow are pivoted rudders or retarding fins 62 which, under normal conditions, are disposed parallel with the sides of the bow of the boat. The rear ends of these rudders or fins are pivotally connected to the forward end of the rod 59 and the latter may be manipulated for the purpose of moving either of the rudders or fins outward so as to retard the progress of the boat at one side and thus guide it in the proper course.

The parts are normally in the position shown in Fig. 1 when the boat is moving straight ahead, that is to say, the anti-friction rollers 56 are at the forward end of the slot 58 of levers 59. If then the steering wheels of the automobile and the steering shoes 52 are turned in one direction, one of the anti-friction rollers will act on the end wall of the slot to thrust its rod 59 outward and forward and thus move the rudder or fin to which said rod is attached outward from the side of the boat, while the mating anti-friction roller will slide idly within its slot and the rudder or fin under its control will not be moved. In this way the course of the boat may be directed and the chauffeur may remain seated in the automobile and operate his machine in the same manner as on land for the purpose of moving ahead or astern at any speed and for turning in either direction.

What is claimed is:—

1. A boat arranged to receive an automobile, a boat propelling device, friction drive belts operatively connected to the propelling device, and means for supporting said belts in position to receive the driving wheels of the automobile, said means being constructed to permit yielding of the belt to conform to the transverse curvature of the automobile wheel.

2. A boat arranged to receive an automobile, a boat propelling device, friction drive belts arranged to receive the driving wheels of the automobile, a plurality of spaced rollers supporting said belts, one of said rollers being provided with a grooved periphery, and driving connections between said rollers and the propelling device.

3. A boat arranged to receive an automobile, a pair of friction drive belts arranged to receive the driving wheels of the automobile, a friction lock for holding said belts from movement to permit the passage of the automobile from engagement with the belts, and a boat propelling device operatively connected to said belts.

4. A boat arranged to receive an automobile, and having its stern midship section cut away, a propeller mounted in the space at the stern, a shaft carrying the propeller, a counter-shaft to which the propeller shaft is operatively connected, a pair of sets of rollers each comprising a pair of rollers of relatively large diameter, and an intermediate grooved roller of smaller diameter, a shaft carrying the several rollers, gearing connections between one of said shafts and the counter-shaft, a friction drum on the counter-shaft, a band brake encircling the friction drum, and means for actuating said band brake.

5. A boat arranged to receive an automobile, a pair of independently operable steering rudders arranged one at each side of the boat, steering shoes connected to the rudders and arranged to receive the front or steering wheels of the automobile, and adjustable supports on which said steering shoes are pivotally mounted.

6. A boat arranged to receive an automobile, a pair of independently operable steering rudders pivoted one at each side of the boat, telescopic rods extending from the rear ends of the rudders, each rod being provided with an elongated slot, a pair of guides arranged in parallel relation near the bow of the boat, blocks adjustable longitudinally of the guide, to accommodate automobiles having different lengths of wheel base, steering shoes pivoted on the blocks and arranged to receive the front or steering wheels of the automobile, arms projecting from the blocks, and anti-friction rollers carried by said arms and entering the elongated slots of the connecting rods.

In testimony that I claim the foregoing as my own, I have hereto affixed my signature in the presence of two witnesses.

JOHN W. FREEMAN.

Witnesses:
C. E. COYLE,
JAS. M. WALKER.